United States Patent [19]
Hawkins et al.

[11] Patent Number: 4,757,933
[45] Date of Patent: Jul. 19, 1988

[54] ULTRASONIC WELD LOCATION MASK AND METHOD OF USE

[75] Inventors: Rodney H. Hawkins, Orange; Michael Patrikios, Stratford, both of Conn.

[73] Assignee: American Technology, Inc., Milford, Conn.

[21] Appl. No.: 33,810

[22] Filed: Apr. 3, 1987

[51] Int. Cl.$^4$ .............................................. B23K 20/10
[52] U.S. Cl. ..................................... 228/110; 228/1.1; 156/580.1; 29/701
[58] Field of Search ...................... 228/1.1, 49.1, 110, 228/212; 29/701; 156/73.1, 580.1

[56] References Cited

U.S. PATENT DOCUMENTS

| | | | |
|---|---|---|---|
| 3,143,791 | 8/1964 | Lanahan et al. | 29/701 |
| 3,473,212 | 10/1969 | Beck et al. | 29/203 |
| 3,650,454 | 3/1972 | Concoulas | 228/110 |
| 3,710,479 | 1/1973 | Bernardo et al. | 29/203 B |
| 4,342,090 | 7/1982 | Caccoma et al. | 364/491 |
| 4,596,352 | 6/1986 | Knapp | 228/1.1 |
| 4,646,957 | 3/1987 | Nuss | 29/873 |

FOREIGN PATENT DOCUMENTS 3437749 4/1986 Fed. Rep. of Germany ...... 228/110

*Primary Examiner*—Nicholas P. Godici
*Assistant Examiner*—Richard K. Seidel
*Attorney, Agent, or Firm*—Kramer, Brufsky & Cifelli

[57] ABSTRACT

Apparatus for the automated feeding, placement and ultrasonic welding of a metal disc, such as a copper heatsink, to a recipient workpiece. A metal disc is automatically fed through the broader end of a chamfered bore cut in a weld location mask. The metal disc is gravity-fed to the narrower end of the bore as the weld location mask is automatically positioned over a recipient workpiece. An ultrasonic welding tip is inserted through the bore to hold the metal disc against the recipient workpiece. Welding of the disc to the recipient workpiece is accomplished by ultrasonically vibrating the tip.

7 Claims, 1 Drawing Sheet

ULTRASONIC WELD LOCATION MASK AND METHOD OF USE

BACKGROUND OF THE INVENTION

1. Field of the Invention

This invention relates to a template-like mask and its use to accurately position a metal disc, such as a copper heatsink on a surface to which it is to be welded. The mask limits any lateral movement of the disc with respect to the surface as an ultrasonic welding tip presses and bonds the disc against the surface during the welding process.

2. Description of the Prior Art

Metal plates may be ultrasonically welded to one another by placing them firmly against each other between an ultrasonic welding tip and a stationary surface or anvil and applying ultrasonic energy to the tip. The ultrasonic energy is transmitted to the metal plate workpieces causing them to intermolecularly bond one to another. A major advantage of this process is that conductive metals or metals with dissimilar characteristics such as melting temperatures which may present difficulties in thermal welding are easily bonded. This is important in a process which would, for example, attach a copper heatsink to an aluminum backing. Additionally, as little heat is generated by the process, there is little if any cooling time required between welding and subsequent handling. This characteristic is highly desired for high-volume high-throughput automated processes as no cooling step is required.

A device which would automatically place and accurately position a metal disc against a recipient metal backing followed by the ultrasonic welding of this workpiece would augment the process even further. This invention relates to such a device.

SUMMARY OF THE INVENTION

In accordance with the present invention, apparatus including a positioning mask on a metal backing is provided for use during ultrasonically welding a metal disc to a recipient metal backing plate or workiece. A disc-shaped metal heatsink can be fed through the broader end of a chamfered bore cut in the positioning mask. This broader end of the chamfered bore is larger than the metal heatsink. The metal heatsink is then gravity fed through the narrower end of the chamfered bore. The narrower end of the chamfered bore provides a guided fit around the metal heatsink. The mask is automatically positioned such that the metal heatsink is laterally confined in the desired positon against the automatically placed recipient workpiece or plate by the narrower end of the chamfered bore. An ultrasonic welding tip is automatically inserted through the broader end of the chamfered bore such that it holds the metal heatsink firmly against the recipient workpiece in the desired position. The worksurface of the ultrasonic welding tip is serrated so as to tightly grip the workpiece thereby assuring efficient transmission of ultrasonic energy to the workpiece. The welding tip is then vibrated ultrasonically to effect welding between the metal heatsink and the recipient workpiece. Since the mask provides a guided fit or one limiting movement, rather than a precise fit where no movement is permited, there is sufficient room to vibrate the heatsink so that the vibrated ultrasonic bond of the heatsink to the workpiece may be readily accomplished.

BRIEF DESCRIPTION OF THE DRAWINGS

Further objects and advantages of the invention will become apparent from the following description and claims and from the accompanying drawing wherein:

DETAILED DESCRIPTION OF THE PREFERRED EMBODIMENT

Figure 1:
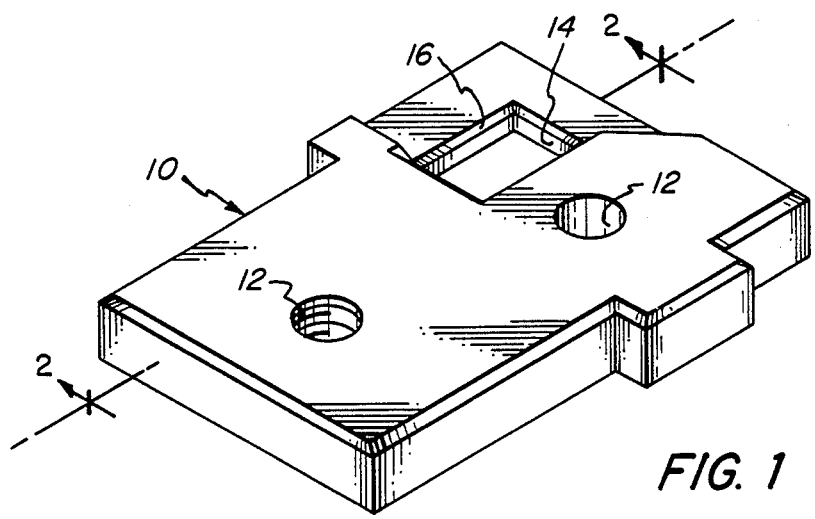
FIG. 1 is a perspective view of the weld location mask of the present invention.

Referring now to the drawing in detail wherein like numerals indicate like elements throughout the several views, the present invention includes and relates to the use of a weld location mask 10.

Figure 2:
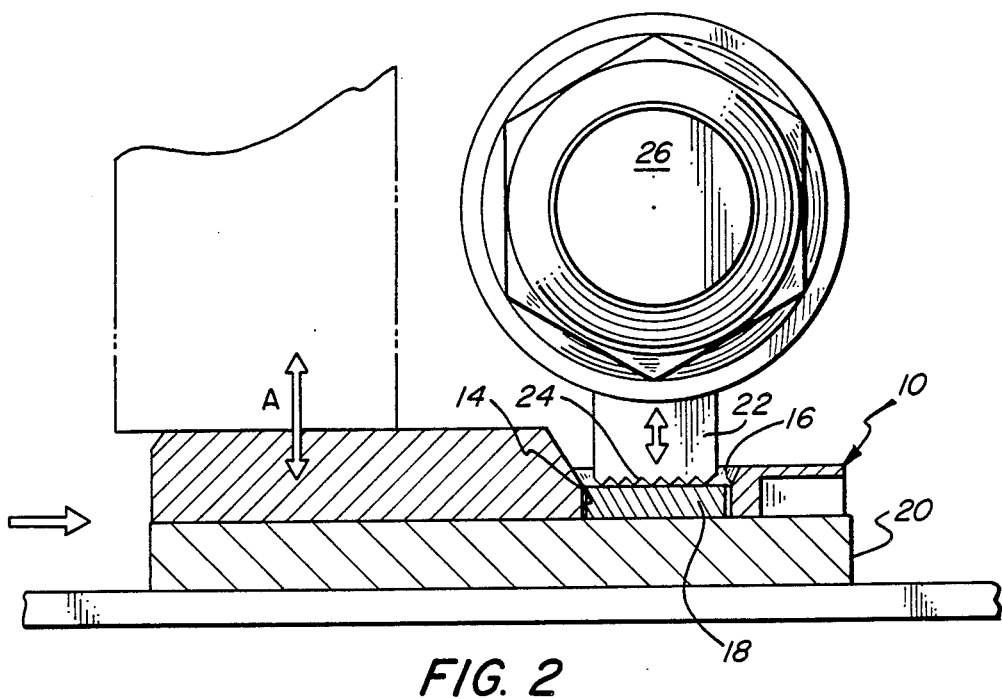
FIG. 2 is a cross-sectional view of the mask of FIG. 1 taken substantially along the plane indicated by line 2—2 of FIG. 1, in use to position a metal heatsink on a metal workpiece during an ultrasonic welding process.

This weld location mask 10 has threaded mounting holes 12 for attachment to an automated placement means. A totally bounded aperture or bore of finite dimension, such as for example, chamfered, substantially rectantular bore 14 is cut in the weld location mask 10. The chamfer 16 is cut such that the larger end of the chamfered bore 14 is facing upwards, as shown in FIG. 2. The smaller end of the chamfered bore approximates the size and shape of a metal disc 18, such as a metal heatsink to be positioned and welded ultrasonically to a recipient backplate or metallic workpiece 20. The larger end of bore 14 provides a means to guide the metal workpiece 18 into bore 14 and further allows for automated feeding of the metal disc workpiece 18 into the wider end and through the chamfered bore 14. The metal disc workpiece 18 can fall to the bottom of the chamfered bore 14 and prevented from undue movement by contact with the walls of bore 14 in close proximity to the edges of workpiece 18.

In use, as shown in FIG. 2 by arrow A, automatic placement means (not shown) positions the weld location mask 10 on a precise spot on the recipient workpiece 20, where the disc 18 is to be located and welded. The disc 18 is dropped through the chamfered upper end 16 of bore 14 onto the upper surface of workpiece 20. An ultrasonic welding tip 22 is inserted through the broader end of the chamfered bore 14 such that the serrated worksurface 24 contacts the metal disc workpiece 18 thereby holding it firmly against the recipient workpiece 20. Welding of the metal disc workpiece 18 to the recipient workpiece 20 is effected by the ultrasonic welding horn 26 vibrating the ultrasonic welding tip 22, in a well-known manner.

A process is thereby achieved wherein metal disc workpieces 18 are ultrasonically welded to recipient workpieces 20. Due to the low heat generation inherent in the ultrasonic welding process, a high-throughput automated process may be achieved.

What is claimed is:

1. An apparatus for automatic placement and ultrasonic welding of a metal workpiece to a recipient metal backing, comprising:

weld location mask means having a totally bounded aperture of finite dimension extending therethrough for positioning and laterally confining the metal workpiece against the recipient metal backing;

said mask means having means to guide said metal workpiece into said aperture and to position the metal workpiece at a predetermined location on the recipient metal backing; and means for inserting an ultrasonic welding tip through one end of said aperture to hold and weld said disc to said metal backing.

2. The apparatus of claim 1 wherein said guide means comprises:

a chamfered surface about one end of said aperture for receiving said metal workpiece, said chamfered surface being disposed so as to slope outwards towards the one end of said aperture; and the unchamfered portion of the aperture being the approximate size and shape of the metal workiece whereby said metal workpiece is laterally confined and positioned against the recipient metal backing.

3. The apparatus of claim 2 including automatic placement means for positioning said mask against said recipient metal backing.

4. The process for placing and ultrasonically welding a metal article to a recipient metal backing, comprising the steps of:

positioning a weld location mask with a totally bounded bore of finite dimension extending therethrough against the recipient metal backing;

guiding the metal article into the bore of said mask;

confining the metal article laterally in said bore;

positioning the metal article at a predetermined location on the recipient metal backing;

inserting an ultrasonic welding tip through one end of said bore of said weld location mask;

holding said metal article against said recipient metal backing with said ultrasonic welding tip; and welding said metal article to said recipient metal backing by ultrasonically vibrating said ultrasonic welding tip.

5. The process of claim 4 including the steps of:

providing the bore with a chamfered end and an opposite unchamfered end;

positioning said welding mask so that the unchamfered end is against the recipient metal backing;

guiding the metal article into the chamfered end of said bore; and confining the metal article in the unchamfered end of the bore.

6. The process of claim 5 including the step of automatically positioning said mask on said recipient metal backing.

7. The process of claim 5 including the step of inserting said welding tip into the chamfered end of said bore to contact said metal article disposed on the unchamfered end of the bore.

* * * * *